US007947350B2

(12) United States Patent
Lavosky

(10) Patent No.: US 7,947,350 B2
(45) Date of Patent: May 24, 2011

(54) FILM LABEL AND COATING

(76) Inventor: Richard Lavosky, Clarksville, TN (US)

( * ) Notice: Subject to any disclaimer, the term of this patent is extended or adjusted under 35 U.S.C. 154(b) by 383 days.

(21) Appl. No.: 11/467,360

(22) Filed: Aug. 25, 2006

(65) Prior Publication Data

US 2007/0048480 A1 Mar. 1, 2007

Related U.S. Application Data

(60) Provisional application No. 60/711,881, filed on Aug. 26, 2005.

(51) Int. Cl.
*B32B 33/00* (2006.01)

(52) U.S. Cl. .......................... 428/40.1; 428/203; 283/81

(58) Field of Classification Search ........................ None
See application file for complete search history.

(56) References Cited

U.S. PATENT DOCUMENTS

| | | | | |
|---|---|---|---|---|
| 5,366,251 | A | 11/1994 | Brandt et al. | |
| 6,521,308 | B1 * | 2/2003 | Bourdelais et al. | 428/40.1 |
| 6,680,097 | B1 * | 1/2004 | Amberger et al. | 428/40.1 |
| 6,815,207 | B2 * | 11/2004 | Yabuki et al. | 436/2 |
| 2002/0061595 | A1 * | 5/2002 | Yabuki et al. | 436/39 |
| 2002/0119292 | A1 * | 8/2002 | Venkatasanthanam et al. | 428/174 |
| 2003/0124293 | A1 * | 7/2003 | Sher et al. | 428/42.3 |
| 2004/0029030 | A1 * | 2/2004 | Murray | 430/130 |
| 2004/0142136 | A1 * | 7/2004 | Truog | 428/40.1 |
| 2006/0083894 | A1 * | 4/2006 | Vetrovec et al. | 428/137 |
| 2011/0020578 | A1 | 1/2011 | Gavel et al. | |

FOREIGN PATENT DOCUMENTS

| | | | |
|---|---|---|---|
| WO | WO02074877 | * | 9/2002 |
| WO | WO03060031 | * | 7/2003 |
| WO | WO2005052082 | * | 6/2005 |

* cited by examiner

*Primary Examiner* — Jennifer C McNeil
*Assistant Examiner* — Vera Katz
(74) *Attorney, Agent, or Firm* — Wayne Edward Ramage; Baker Donelson

(57) ABSTRACT

A film label comprising a film layer with printed material on the front or back surface, where the back surface may be covered with an overprint coating. The overprint coating protects any reverse-printed material, and may be colored or patterned, or both. One exemplary pattern is achieved by alternating coating weights to create a series of lands (i.e., raised areas) and groove (i.e., lower areas). The grooves help move entrapped air and gasses from the back side of the label, and may help water in a water-based adhesive wick away. The pattern can be a series of sinusoidal waves, curves, straight lines, or a variety of other patterns. The coating may also be used on opaque labels to assist in drying the label adhesive.

29 Claims, 7 Drawing Sheets

FILM LABEL AND COATING

This application claims priority to Provisional Patent Application No. 60/711,881, filed Aug. 26, 2005, by Richard Lavosky, and is entitled to that filing date for priority. The specification of Provisional Patent Application No. 60/711,881 is incorporated herein in its entirety by reference.

FIELD OF INVENTION

This invention relates to labels that are applied to surfaces, including surfaces and containers made of glass, metal, or plastic, and a method and system of producing and applying such labels. More particularly, the present invention relates to the application of opaque labels with a coating, and the application of transparent or clear labels with a coating so as to achieve a "no-label" appearance on a surface.

BACKGROUND OF INVENTION

A wide variety of glass, metal and plastic containers are used to hold, store and ship liquids, including beverages. Manufacturers apply labels to the containers for informational, marketing and advertising purposes. Labels in various forms also are applied to a variety of surfaces, including but not limited to windows, doors, tires and vehicles, for similar reasons.

Originally, paper was the most common substrate used for labels. Subsequently, several types of clear or translucent plastic, polyolefin, or polymer labels (i.e., "film labels") were created. The use of film labels has increased because the appearance when applied to a glass or plastic surface or container simulates "painted glass" so as to provide something approaching a "no label" look. The objective is to have the text and graphics on the label appear to be painted directly on the surface or container itself. In addition, clear film labels when used on containers allow consumers to see the beverage, liquid or product in the container, to the extent the container itself allows. Some marketing studies indicate that consumers seem to prefer being able to see the beverage in the container.

With respect to the beverage industry today, there are two common forms of applying labels to containers: the "cut-and-stack" method; and the pressure sensitive method. In the cut-and-stack method, labels typically are attached to containers using water-based glue or adhesive and standard cut-and-stack labeling equipment, such as equipment manufactured by Krones or Phoenix Manufacturing. Adhesive is dispensed and metered by a glue roller, and transferred to glue pallets. A stack of pre-cut labels is inserted into the labeling machine, and are removed one at a time from the stack by the glue pallets, which apply the adhesive on the glue pallet to the back of the label. The label is then positioned on the container, and the labeler performs a series of wiping actions to ensure that the glue is uniformly spread and the label is adhered to the container. The water base of the adhesive evaporates through the label or from around the edges of the label, allowing the adhesive to dry and thereby securing the label to the container.

The cut-and-stack method works well with paper-based labels because the water base of the adhesive can evaporate through the porous paper substrate of the label. Film labels generally are not made of a porous material, however, thus preventing this form of evaporation. When using film labels for cut-and-stack labels, label producers typically print the text and graphics on the outer or "first" surface of the film. In order to allow the water in the adhesive a path to "escape", a hydrophilic, glue-receptive coating may be applied to the "second" (inner or container-side) surface of the film label. The hydrophilic coating serves as an attachment layer for the adhesive, while the film label serves as a barrier to protect the printed inks on the outer surface from the caustic, water-based adhesive.

At present, the most common clear film labels for surfaces and containers are pressure sensitive, or self-adhesive, labels. In the pressure sensitive method, a film label manufacturer produces a laminated substrate comprising a clear film layer (which will become the label), a pressure sensitive adhesive layer, a silicone release coating layer, and a backing (liner) film. Because the pressure sensitive label stock is a laminated structure, label producers typically print on the outer or first surface of the clear film layer.

With both methods, the first surface of the label usually is exposed to scuffing during the production process, and during shipping and handling. As a result, label producers must use inks and coatings formulated with additives for scuff resistance. These additives typically reduce the opacity of the inks, however, resulting in degraded aesthetics unless multiple layers of ink are applied, thus increasing production costs. In addition, if a glossy label is desired, the producer must use inks formulated with gloss additives. These additives further reduce the opacity of the inks. As a result, many manufacturers of pressure sensitive labels use slow, rotary screen presses that apply a thick layer of ink to the first or outer surface of the film layer.

In addition, clear or solid color film labels do not achieve a satisfactory "no label look." Gas bubbles or glue voids form between the label and the bottle. And clear or solid color films still are readily distinguishable from the underlying container.

Thus, what is needed is an inexpensive, easy-to-manufacture film label that protects the printed image on the label from abrasion or scuffing, can be used in any clear film label application, and produces a satisfactory "no label look." In addition, what is needed is a label coating that can be used with clear film and opaque film labels to achieve satisfactory application to surfaces.

SUMMARY OF THE INVENTION

In one exemplary embodiment, a film label comprises a film layer made of any suitable material, including but not limited to clear polypropylene film, oriented polypropylene, biaxially oriented polypropylene (BOPP), polyester (PET), polylactic acid, or polyethylene film. The back (or second) surface of the film layer may be printed with a logo, graphics, text, or other matter (i.e., reverse printing), which protects the printed material or images from abrasion, damage or scuffing.

The back (or second) surface of the film layer may then be covered with an overprint coating. The overprint coating may be applied to just the reverse-printed material, to just the unprinted area of the film layer, or both. When applied to the reverse-printed material, the overprint coating protects the ink from re-wetting or dissolving upon contact with the adhesive.

In another exemplary embodiment, an adhesive layer comprising a pressure sensitive adhesive, with a label release coating and label liner, may be applied over the overprint coating to form a pressure-sensitive label.

In another exemplary embodiment, the film layer may be glossy, so that the inks used to print the image do not need gloss agents or additives, thus allowing the inks used to be formulated for high opacity.

In another exemplary embodiment, the printed materials and images are printed on the outer (or first) surface of the film layer. A protective coating may then be applied to some or all of the first surface and printed image so as to protect the printed matter, and in some embodiments, add gloss to the label. The overprint coating may still be used to achieve the benefits described herein other than protection of the printed matter.

In yet another exemplary embodiment, the overprint coating can be patterned or colored, or both, in a variety of ways. One example of a pattern can be achieved by alternating coating weights to create a series of lands (i.e., raised areas) and grooves (i.e., lower areas). This pattern can be a series of sinusoidal waves, or some other pattern. The land elements of the pattern may be higher or raised with respect to the grooves on the adhesive side of the coating. The grooves can help move entrapped air and other gasses from the back side of the label during the adhesive wipe down process on a labeling machine. Providing gases with escape paths could reduce the appearance of bubbles and glue voids behind the film, which detract from the appearance of the applied label. The grooves also allow water in a water-based adhesive to wick away to the edges of a cut-and-stack label without the use of a hydrophilic coating or layer.

The land and groove elements may be clear or colored. They can both be clear, or the same color, or different colors. A particular element may also vary in color in itself. They can be different widths or have the same width. They can be constant or varying width, or a combination. In addition, land elements can differ in width or color among themselves, as can groove elements. The pattern can be a series of sinusoidal waves oriented vertically, or oriented horizontally, diagonally, or at an angle. The pattern also can be a series of straight lines, curves, zig-zags, stripes, dots, or the like, or a combination of any of these. The land and groove elements can have distinct boundaries, or gradual or no clear boundaries (i.e., a vignette or gradient pattern). The pattern can also be a gradient.

In another exemplary embodiment, the overprint coating can be patterned so as to alter the light reflection characteristics of the film to achieve a variety of effects, including but not limited to a "no label look."

Various embodiments of the present invention can be used to form both cut-and-stack and pressure sensitive labels. For cut-and-stack labels, the label comprises the reverse-printed film layer and coating, which are placed in the labeling equipment as a stack, adhesive is applied, and the label is applied to the bottle as normal. For pressure sensitive labels, a coating is applied to the second surface of the film layer and a pressure sensitive adhesive layer, silicone release coating layer, and backing film are applied to the back of the coating.

In yet another exemplary embodiment, the coating may be used with opaque labels of various construction to assist in the drying of the label adhesive.

DETAILED DESCRIPTION OF THE INVENTION

Figure 1:
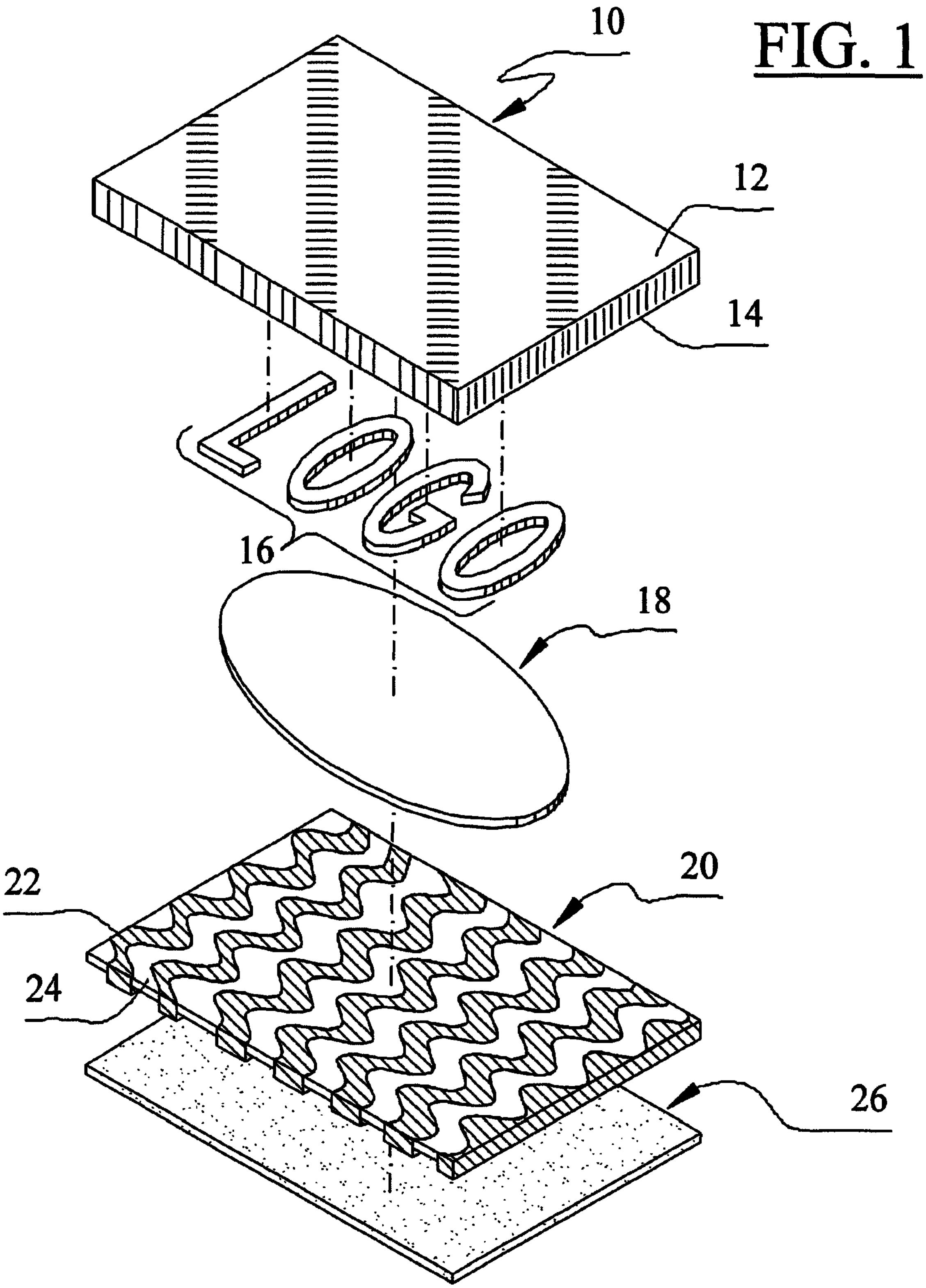
FIG. 1 shows an exploded view of a reverse printed label in accordance with one embodiment of the present invention.

Referring now to the numerous figures, wherein like references identify like elements of the invention, FIG. 1 illustrates a film label in accordance with one exemplary embodiment of the present invention. A film label comprises a film layer 10 with a first or outer surface 12 and a second or inner surface 14. The film layer can be made of any suitable material, including but not limited to clear polypropylene film, oriented polypropylene, biaxially oriented polypropylene (BOPP), polyester (PET), polylactic acid, or polyethylene film. An image printed area on the second surface 14 may contain the text of a logo 16 and associated label graphics, such as a colored oval 18. Printing on the second surface of the film layer (i.e., "reverse printing") protects the printed material or images 16, 18 from abrasion, damage or scuffing during production, application, and handling. As a result, scuff resistant additives do not need to be added to the inks used to print the images 16, 18, allowing the inks to be formulated for high opacity. In addition, multiple layers of ink do not need to be applied to achieve high opacity.

The second surface 14 of the film layer 10, including the unprinted areas of the film layer as well as the reverse-printed material 16, 18, may then be completely covered with an overprint coating 20. In an alternative exemplary embodiment, the overprint coating 20 is applied over the reverse-printed material 16, 18 sufficiently to protect the inks used in the reverse-printed material 16, 18 from the adhesive layer 26, which is applied to the overprint coating 20 on the side opposite the film layer 10. The overprint coating 20 protects the inks from re-wetting or dissolving upon contact with the caustic adhesive.

Figure 3:
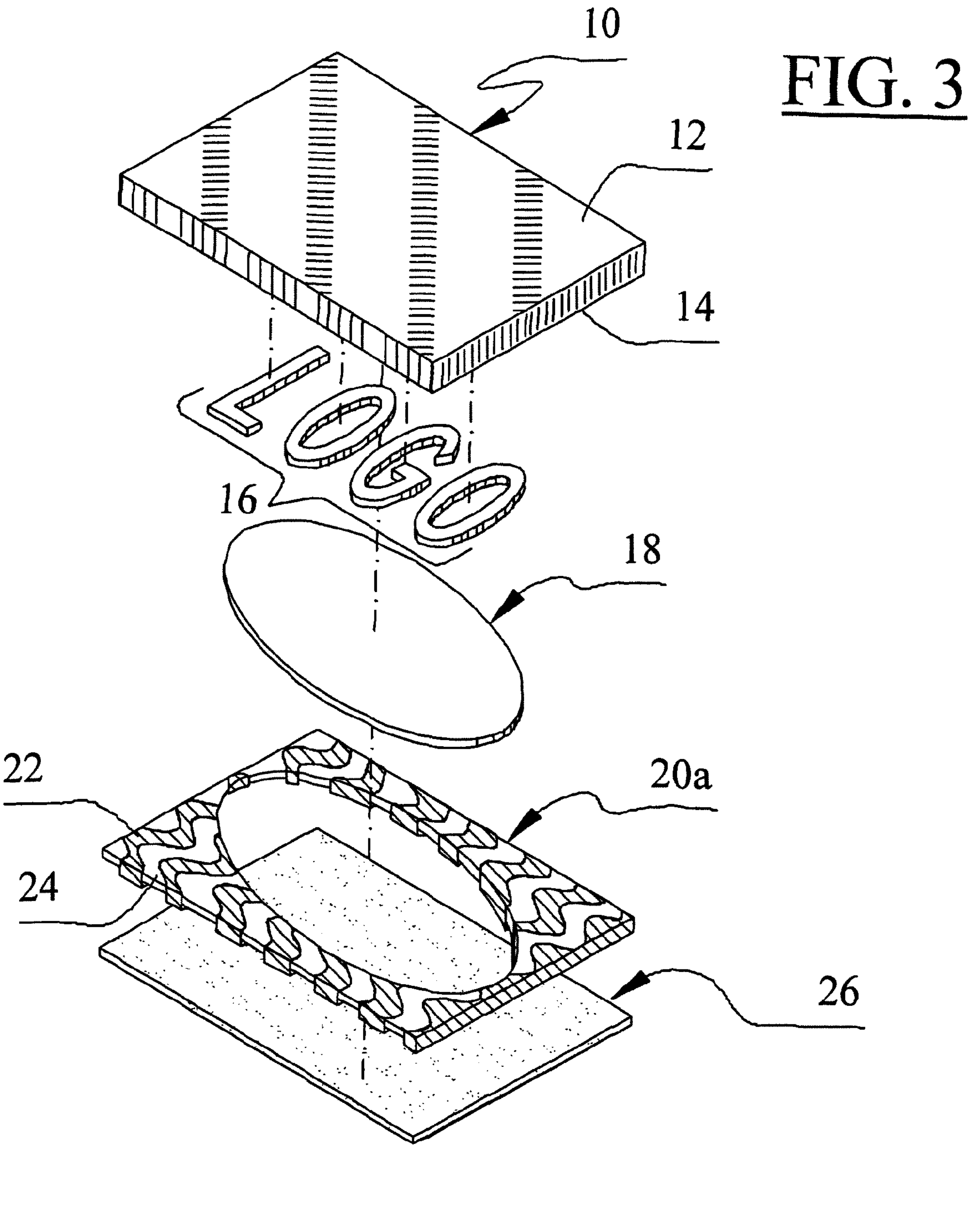
FIG. 3 shows an exploded view of a reverse printed label with a coating applied to non-image areas on the second surface of the substrate in accordance with one embodiment of the present invention.

In yet another alternative exemplary embodiment, as seen in FIG. 3, the overprint coating 20 is applied over the unprinted area of the second surface 14, thereby leaving the reverse-printed material 16, 18 uncovered. The overprint coating 20 may be applied in a thickness to match the thickness of the reverse-printed material 16, 18, so as to achieve an approximately uniform thickness across the second surface 14 of the film layer 10. As the reverse-printed material 16, 18 is not protected by the coating 20, the inks used may be subject to degradation due to exposure to caustic adhesive, if used. Accordingly, alternative embodiments may include the use of a non-caustic adhesive, or caustic resistant inks, or both.

Figure 2:
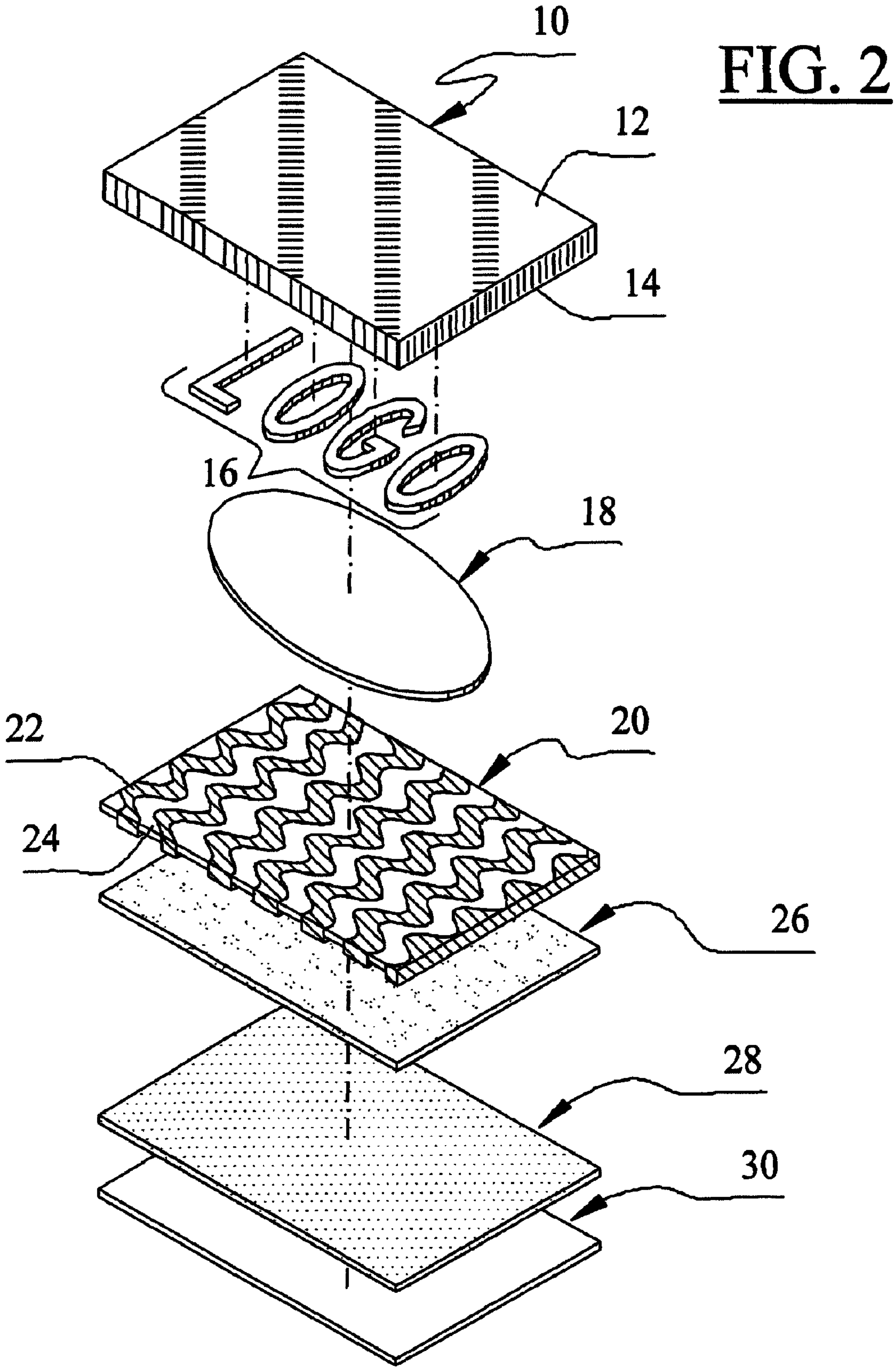
FIG. 2 shows an exploded view of a reverse printed label with pressure sensitive adhesive in accordance with one embodiment of the present invention.

FIG. 2 shows another alternative exemplary embodiment where the label is configured as a pressure-sensitive label. The adhesive layer 26 comprises a pressure sensitive adhesive, and is covered with a pressure sensitive label release coating 28 and pressure sensitive label liner 30 in accordance with the prior art. The various compositions and configurations of potential pressure sensitive label adhesives, release coatings and liners are well known in the art.

In another exemplary embodiment, the film layer 10 may be glossy. The first surface 12 thus reflects gloss light at the film/air interface, imparting gloss to the printed image 16, 18. As a result, the inks used to print the image 16, 18 do not need gloss agents or additives, thus allowing the inks used to be formulated for high opacity.

Figure 4:
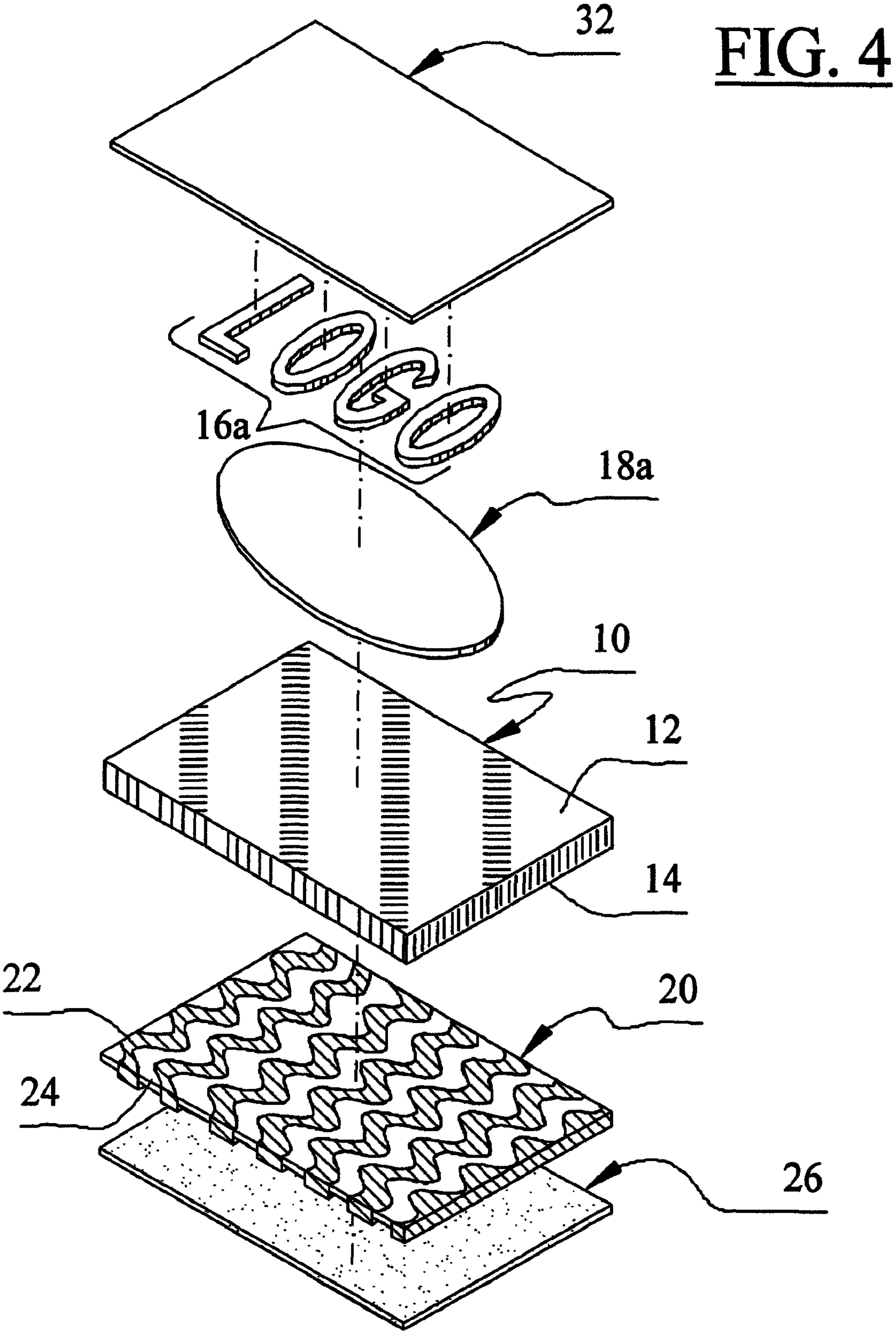
FIG. 4 shows an exploded view of a surface printed label in accordance with one embodiment of the present invention.

In another exemplary embodiment, as shown in FIG. 4, the printed materials and images 16, 18 are printed on the first surface 12 of the film layer 10. A protective coating 32 may then be applied to some or all of the first surface and printed image 16, 18 so as to protect the printed matter, and in some embodiments, add gloss to the label. The overprint coating 20 may still be used to achieve the benefits described herein other than protection of the printed matter.

In yet another exemplary embodiment, the overprint coating can be patterned or colored, or both, in a variety of ways. For example, as shown in FIG. 1, a pattern can be achieved by alternating coating weights to create a series of lands (i.e., raised areas) 22 and grooves (i.e., lower areas) 24. This pattern can be a series of sinusoidal waves, as seen in FIG. 1, or some other pattern. The land 22 elements of the pattern may be higher or raised with respect to the grooves 24 on the adhesive side 26 of the coating 20. The grooves 24 can help move entrapped air and other gasses from the back side of the label during the adhesive wipe down process on a labeling machine. Providing gases with escape paths could reduce the appearance of bubbles and glue voids behind the film, which detract from the appearance of the applied label. The grooves 24 also allow water in a water-based adhesive to wick away to the edges of a cut-and-stack label without the use of a hydrophilic coating or layer.

Figure 5A:
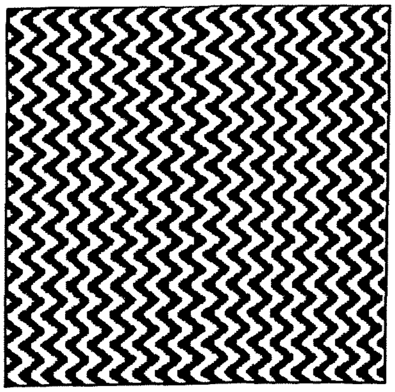
FIG. 5*a-f* shows a range of possible patterns for the coating in accordance with one embodiment of the present invention.
Figure 5B:
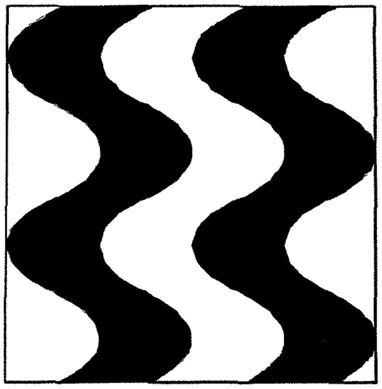
Figure 5C:
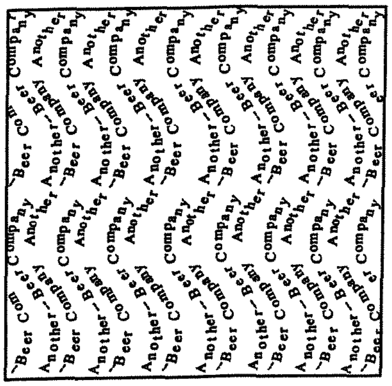
Figure 5D:
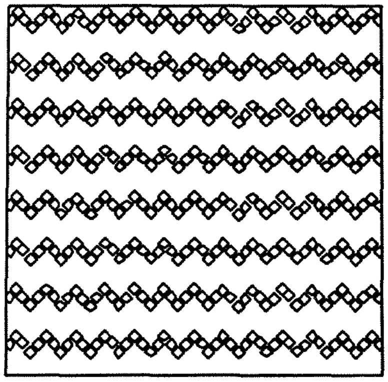
Figure 5E:
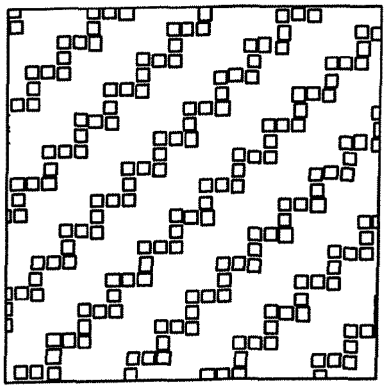
Figure 5F:
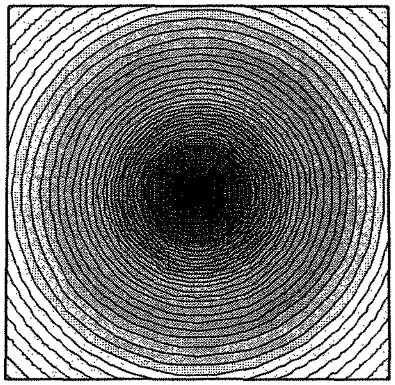

The land 22 and groove 24 elements can be clear or colored. They can both be clear, or the same color, or different colors. A particular element may also vary in color in itself. They can be different widths or have the same width. They can be constant or varying width, or a combination. In addition, land 22 elements can differ in width or color among themselves, as can groove 24 elements. The pattern can be a series of sinusoidal waves oriented vertically, as seen in FIG. 1, or oriented horizontally, diagonally, or at an angle. The pattern also can be a series of straight lines, curves, zig-zags, stripes, dots, or the like, or a combination of any of these. The land and groove elements can have distinct boundaries, or gradual or no clear boundaries (i.e., a vignette or gradient pattern). The pattern can also be a gradient. FIG. 5 shows various, nonexclusive alternatives with regard to some possible shapes and dispositions of the coating pattern. FIG. 5*a* shows a sinusoidal wave pattern of alternating coating weights to create a series of lands and grooves as described above. The waves are sized to match the wave patterns exhibited in standard glass bottles. FIG. 5*b* shows a larger scale wave pattern. FIG. 5*c* shows a pattern of lands and grooves formed by text. FIG. 5*d* shows a horizontal micro-macro pattern. A series of diamond shapes in the micro pattern are combined to form a macro pattern of horizontal bands. FIG. 5*e* shows a diagonal micro-macro pattern. FIG. 5*f* shows a gradient pattern that has its highest opacity in the center and tapers off gradually to the edges of the label.

Figure 6:
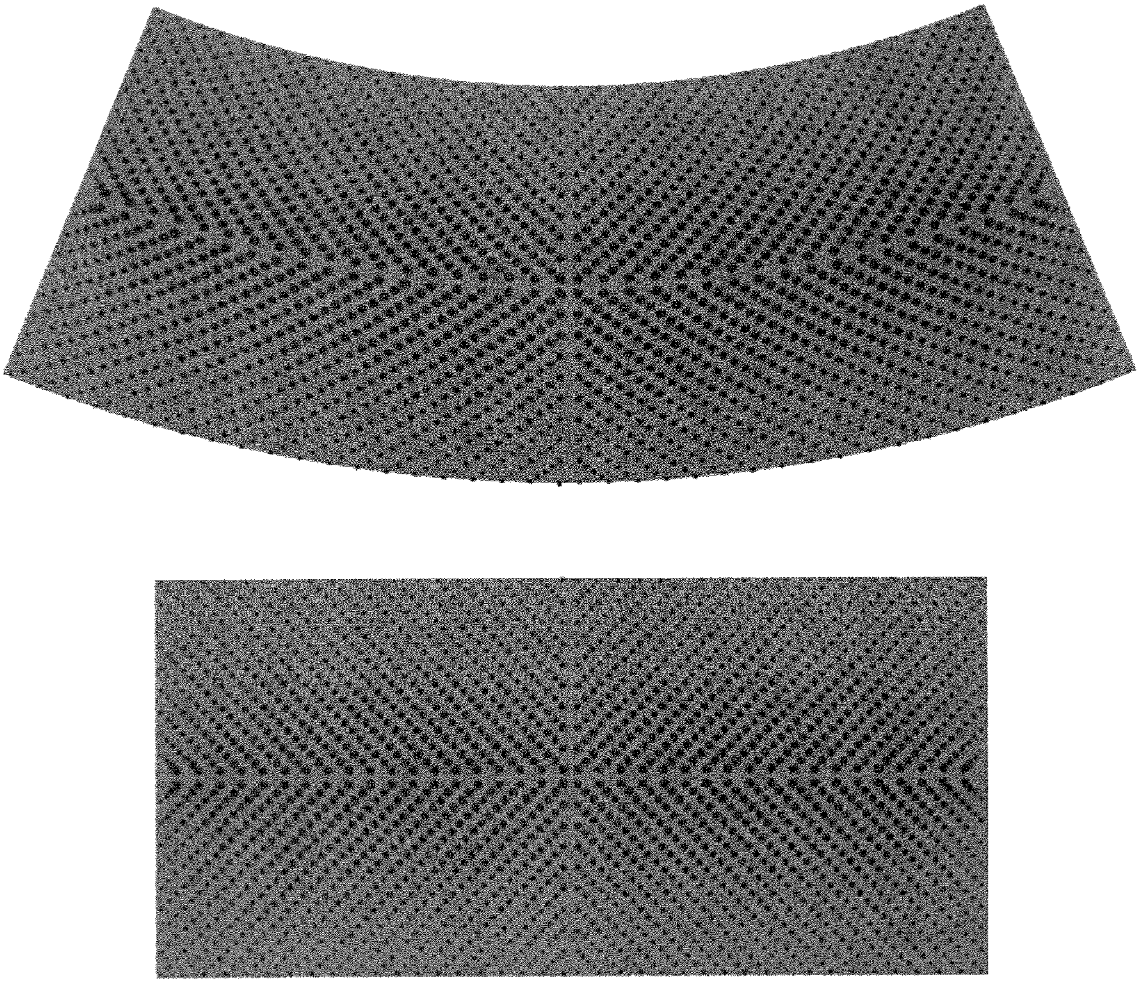
FIG. 6 shows an example of a "registered" coating pattern.
Figure 7:
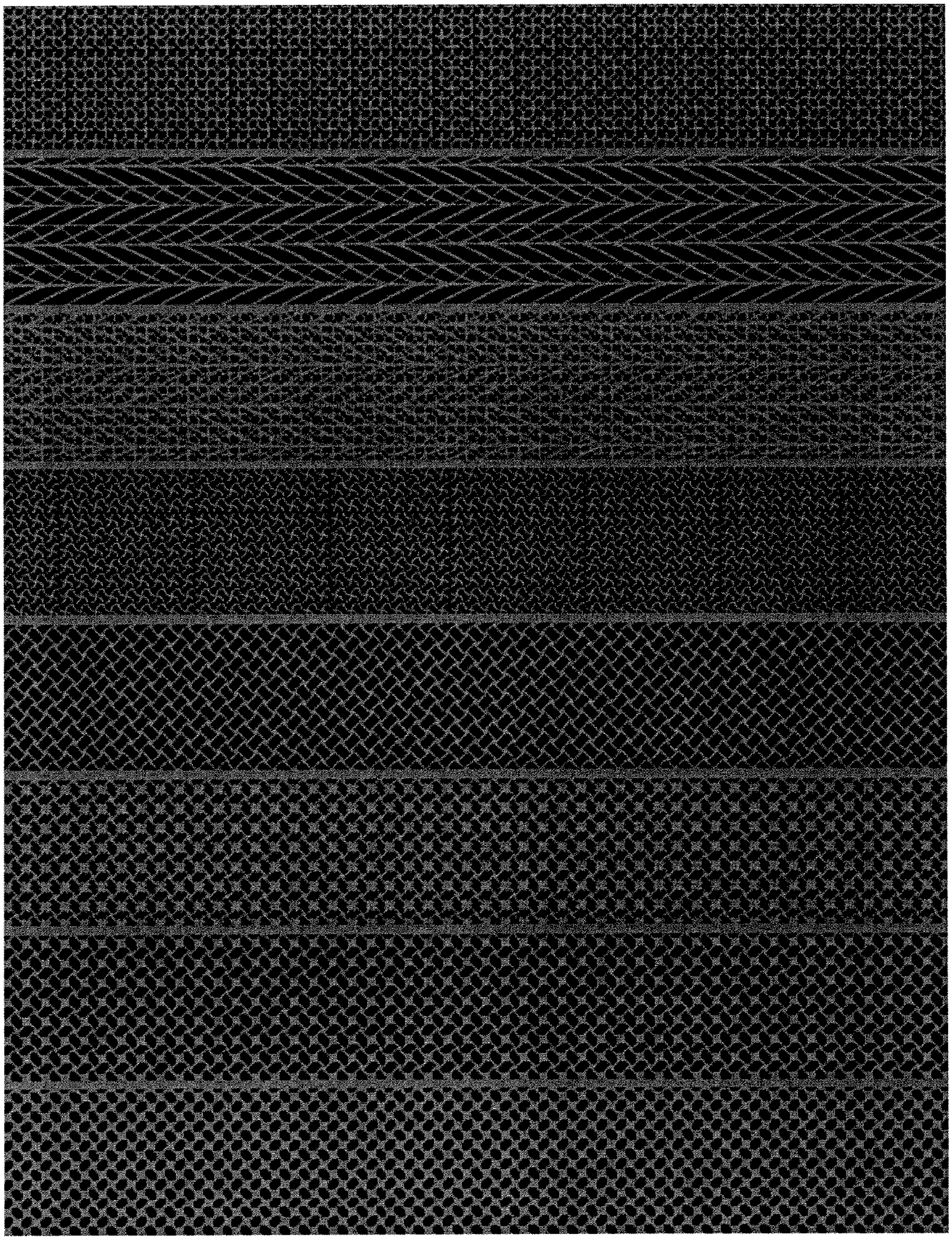
FIG. 7 shows several examples of overall or "unregistered" coating patterns.

FIGS. 6 and 7 show additional patterns representative of two approaches to achieving the desired functional and optical properties of exemplary embodiments of the present invention. The patterns shown incorporate the high/raised areas (land) and low areas (grooves) described above, which provide paths for gas and vapors to escape from behind the label. In addition, the patterns shown are designed to reduce the value contrast between the label and the container, and provide light and dark areas that cause the label to blend into the background. FIG. 6 illustrates a "registered" pattern, while FIG. 7 illustrates a variety of "unregistered" (i.e., overall) patterns.

Registered patterns can be perfectly centered on the label, thus providing gas and vapor channels that are optimized for a particular label size and shape. This can increase the cost, however, as each label size and shape may require a specific coating cylinder or plate that would have to be registered with the other printed colors. Overall, or unregistered, patterns, if designed properly, can still contribute to label concealment by achieving little value contrast between the label and the background container, by displaying little color contrast between the label and the background container, and by maintaining a suitable intra-pattern differentiation. In addition, one cylinder or printing plate may be used for several different label sizes and shapes. The printer would only have to adjust the color of the coating to correspond to the particular containers.

In another exemplary embodiment, the overprint coating can be patterned so as to alter the light reflection characteristics of the film to achieve a variety of effects, including but not limited to a "no label look." The prior art has demonstrated that a clear or solid color film label, when applied to a surface or bottle or plastic container, does not achieve a satisfactory "no label look." A satisfactory "no label look" is achieved with the present invention, however, using a light dispersing coating that comprises a pattern of light and dark areas that match or correspond to the texture of the background (i.e., the container or surface on which the label is placed). The color, color contrast, value contrast between the pattern and the background, and the intra-pattern differentiation all can be varied depending on the particular container or surface.

This effect may derive from some basic properties of light. Light has two main responses to a substance: it reflects off the surface and/or it transmits through the substance. With regard to reflections, a substance's surface(s) usually will produce either a specular reflection or a diffuse reflection. When a specular reflection occurs, the surface reflects light in the opposite direction at the same incident angle from the surface—much like the surface of a mirror. Specular reflections usually are perceived by humans as "gloss". When a diffuse reflection occurs, the surface redirects the incoming light and scatters it over a range of angles from the surface. Humans usually perceive diffuse reflections as "matte". In general, the perception of "gloss" with regard to a label thus correlates primarily to what is on the first (or outer) surface of the label. As a result, applying inks or coatings to the first surface of a film label may result in a reduction of the "gloss" perceived by viewers of the label.

With regard to transmission of light through a substance, substance typically bend the path of (i.e., refract) transmitted light and generally permit what is known as either a regular transmission or a diffuse transmission. A material or substance that allows light to pass completely through with little or no interference exhibits a regular transmission of light, and the substance usually is considered transparent. Clear film or clear glass, for example, is often considered transparent. A substance that diffuses or scatters much of the passing light exhibits a diffuse transmission of light, and the substance typically is considered translucent.

From one viewpoint, clear film labels may be looked upon as having three objects and three surfaces to consider with regard to light reflection and refraction. Assuming there is no outer layer overlying the film layer, the film layer typically is the first object that receives the light. The first (i.e., outer) surface of the film thus is the first of the three surfaces mentioned above, and as discussed above, can affect the perception of gloss with regard to the label. The second object is the adhesive which is applied to the second surface of the film (the second of the three surfaces mentioned above). The adhesive forms a light transmitting layer between the film layer and the object or surface being labeled (which is the third object, and the surface of the third object being the third surface).

Typically, when light strikes a clear film label glued to an object, some light is reflected by the first surface of the film which an observer generally perceives as gloss. Some quantity of light transmits through the film and is reflected by the second surface of the film. Some light continues through the second surface of the film and is transmitted through the adhesive. A quantity of the light transmitted through the adhesive is reflected by the surface of the object being labeled back through the adhesive and the film.

In general, when the adhesive layer is perfectly uniform, the label may be called "contact clear" in the industry. In this case, the light reflected from the second surface of the film and light reflected from the surface of the labeled object mix uniformly across the label. To an observer, the label may appear to blend in with its background.

However, in practice, the adhesive layer is not always perfectly uniform. Typically, during label fabrication and application, adhesive voids and air bubbles form. At every void and air bubble, light reflects off the labeled object and is refracted through the air in the void or bubble at a different angle than the light refracted through the adhesive. The reflected light creates an interference pattern that an observer may perceive as a loss of "contact clear".

A coating applied to the second surface of the film layer may diffuse and scatter light reflected by the surface of the labeled object without affecting the gloss characteristics of the first surface of the film. This diffusion and scattering may reduce the visual impact of imperfections in label application and thus may promotes what is known as a "no label" look. Additionally, a "no label" look may be promoted by a coating that allows or assists in causing the label to blend in with the background object surface. This blending effect may be achieved in a variety of ways, including, but not limited to, a pattern with appropriate value contract, color contrast, and differentiation.

For example, glass and PET bottles typically exhibit a wavy pattern of imperfections visible through their surfaces. A wavy pattern, or series of sinusoidal waves, on the coating 20 thus has been found to be a good pattern to promote a "no label look" when the label is applied to a glass or PET bottle. The land 22 and groove 24 elements are printed in a color to match the bottle color, with visual pattern differentiation achieved by the density or opacity of the ink. In one exemplary embodiment, the darker element of the pattern achieves greater than 100% actual coverage (heavy coating thickness), while the lighter element achieves 90% or less actual coverage. On a gravure press, this corresponds to 85% screen value for the darker element, and 65% screen value for the lighter element.

Typical bottle colors in the industry are amber, green, and clear. In one exemplary embodiment, the pattern color for a typical amber bottle has been achieved with the following formulation:

PMS-4625 Dark Brown Base Formula
9 parts PANTONE Yellow
7 parts PANTONE Warm Red
6 part PANTONE Black Tint base formula is then mixed 30% base with 70% overprint coating.

In another exemplary embodiment, the pattern color for a typical green bottle has been achieved with the following formulation:

PMS-363 Dark Green Base Formula
10 parts PANTONE Yellow
6 parts PANTONE Process Blue
1 part PANTONE Black Tint base formula is then mixed 30% base with 70% overprint coating.

While the width and spacing of the pattern elements can be any size, the optimal "no label" effect was achieved with a element width of 1 to 2 millimeters, with a maximum spacing between similar pattern elements (i.e., from dark element to dark element) of 4 millimeters.

The same pattern can be used even for nominally "clear" labels, as the same wavy pattern of imperfections can be seen in clear bottles. The coating 20 is not colored, and the pattern is achieved by the variable thickness of the land and groove elements of the coating.

The present invention can be used to form both cut-and-stack and pressure sensitive labels. For cut-and-stack labels, the label comprises the reverse-printed film layer and coating, which are placed in the labeling equipment as a stack, adhesive is applied, and the label is applied to the bottle as normal. For pressure sensitive labels, a coating 20 is applied to the second surface of the film layer and a pressure sensitive adhesive layer, silicone release coating layer, and backing film are applied to the back of the coating 20, as normal.

In yet another exemplary embodiment, the coating may be applied to any label, including an opaque or partially-opaque label, of any construction. In particular, where one or more layers of the label are not porous and do not allow evaporation of the water in the adhesive, the patterned coating provides numerous paths for the water in the adhesive to escape or evaporate.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. A film label, comprising:

a label layer with an adhesive side and an outer side;

printed matter on at least a portion of the adhesive side; and an overprint coating on at least a portion of the adhesive side, wherein said overprint coating is separate from an adhesive layer applied to the adhesive side over the overprint coating;

further wherein the film label is a cut-and-stack label without a pressure sensitive adhesive layer and pressure sensitive label liner.

2. The film label of claim 1, wherein the overprint coating covers all of the printed matter.

3. The film label of claim 1, wherein the overprint coating covers the entire adhesive side.

4. The film label of claim 1, wherein the overprint coating is colored, or patterned, or both.

5. The film label of claim 4, wherein the overprint coating pattern is formed from a series of areas where the overprint coating varies in thickness.

6. The film label of claim 5, wherein the overprint coating pattern is formed from a series of alternating thick and thin layers.

7. The film label of claim 4, wherein the overprint coating pattern comprises a series of sinusoidal waves.

8. The film label of claim 4, wherein the overprint coating pattern comprises a series of grooves or channels in the overprint coating on the side of the overprint coating opposite the label layer.

9. The film label of claim 8, wherein at least a portion of said grooves or channels extend to the edge of the label layer and are adapted to allow gases from an adhesive to escape.

10. The film label of claim 4, wherein the overprint coating pattern is a gradient.

11. The film label of claim 4, wherein the overprint coating pattern is adapted so as to correspond to the wave pattern exhibited in an item on which the film label is placed.

12. The film label of claim 4, wherein the overprint coating pattern comprises text.

13. The film label of claim 12, wherein the light and dark areas are formed by application of different thicknesses of a colored ink.

14. The film label of claim 4, wherein the overprint coating is a color corresponding to the item on which the film label is placed.

15. The film label of claim 14, wherein the colored ink is one color.

16. The film label of claim 4, wherein the overprint coating pattern comprises a pattern of light and dark areas.

17. The film label of claim 16, wherein the light and dark areas are 1 to 2 millimeters in width.

18. The film label of claim 1, wherein the overprint coating is variable in thickness.

19. A film label, comprising:

a label layer with an adhesive side and an outer side;

printed matter on at least a portion of the adhesive side; and an overprint coating on at least a portion of the adhesive side;

wherein the printed matter covers only a portion of the adhesive side, and the overprint coating covers only the portion of the adhesive side without printed matter.

20. The film label of claim 19, wherein the adhesive layer comprises a pressure sensitive adhesive, and is covered with a pressure sensitive label release coating and pressure sensitive label liner.

21. A film label, comprising:

a label layer with an adhesive side and an outer side;

printed matter on at least a portion of the outer side; and a coating, separate from an adhesive, on at least a portion of the adhesive side;

wherein the coating is colored, or patterned, or both.

22. The film label of claim 21, wherein the coating pattern is formed from a series of areas where the coating varies in thickness.

23. The film label of claim 21, wherein the coating pattern is formed from a series of alternating thick and thin layers.

24. The film label of claim 21, wherein the coating pattern comprises a series of grooves or channels in the coating opposite the label layer.

25. The film label of claim 24, wherein at least a portion of said grooves or channels extend to the edge of the label layer and are adapted to allow gases from an adhesive to escape.

26. The film label of claim 21, wherein the coating pattern comprises a pattern of light and dark areas.

27. The film label of claim 26, wherein the light and dark areas are formed by application of different thicknesses of a colored ink.

28. The film label of 21, further comprising an adhesive layer applied to the adhesive side over the coating.

29. The film label of claim 28, wherein the adhesive layer comprises a pressure sensitive adhesive, and is covered with a pressure sensitive label release coating and pressure sensitive label liner.

* * * * *